(12) United States Patent
Hochberg et al.

(10) Patent No.: US 7,373,058 B2
(45) Date of Patent: May 13, 2008

(54) APPARATUS AND METHOD FOR DETECTING OPTICAL RADIATION

(75) Inventors: Michael J. Hochberg, Pasadena, CA (US); Tom Baehr-Jones, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 41 days.

(21) Appl. No.: 11/409,259

(22) Filed: Apr. 21, 2006

(65) Prior Publication Data

US 2007/0009200 A1 Jan. 11, 2007

Related U.S. Application Data

(60) Provisional application No. 60/673,570, filed on Apr. 21, 2005, provisional application No. 60/677,403, filed on May 3, 2005, provisional application No. 60/691,496, filed on Jun. 17, 2005.

(51) Int. Cl.
*G02B 6/00* (2006.01)

(52) U.S. Cl. ............. 385/122; 385/12; 385/14

(58) Field of Classification Search ............ 385/12, 385/14, 122, 129–132, 141, 901
See application file for complete search history.

(56) References Cited

U.S. PATENT DOCUMENTS

| | | | | |
|---|---|---|---|---|
| 2003/0164947 | A1* | 9/2003 | Vaupel | 356/445 |
| 2004/0096181 | A1* | 5/2004 | Bintz et al. | 385/143 |
| 2006/0133720 | A1* | 6/2006 | Hochberg et al. | 385/15 |
| 2006/0228074 | A1* | 10/2006 | Lipson et al. | 385/42 |

OTHER PUBLICATIONS

"High-Q optical resonators in silicon-on-insulator-based slot waveguide", Applied Physics Letters 86, 081101 (2005), Feb. 14, 2005.*

* cited by examiner

*Primary Examiner*—Brian Healy
*Assistant Examiner*—Hung Lam
(74) *Attorney, Agent, or Firm*—Steinfl & Bruno

(57) ABSTRACT

Methods and devices for low power optical detection and modulation in a slotted waveguide geometry filled with nonlinear electro-optic polymers are shown. Direct conversion of optical energy to electrical energy is enabled without external bias, via optical rectification, also enhancing electro-optic modulation.

25 Claims, 7 Drawing Sheets

| Action | New Steady State Current (6 dBm input) |
|---|---|
| Initial State | -5.7 pA |
| +10V for 2 minutes | 0 pA |
| -10V for 2 minutes | -7.1 pA |
| +10V for 2 minutes | -4.4 pA |
| +10V for 4 minutes | -6.1 pA |
| +10 V for 4 minutes | -4.5 pA |
| -10 V for 2 minutes | -14.8 pA |

FIG. 8

| Device | Action | Current Polarity of Optical Rectification |
|---|---|---|
| 1 | Positive Poling | Positive |
| 1 | Thermal Cycling to poling temperature with no voltage | Rapid fluctuation, did not settle |
| 1 | Negative Poling | Negative |
| 2 | Negative Poling | Negative |
| 2 | Thermal Cycling to Poling temperature with no voltage | None observable |
| 2 | Positive Poling | Negative |
| 3 | Negative Poling | Negative |
| 4 | Positive Poling | Positive |
| 5 | Negative Poling | Negative |

FIG. 9

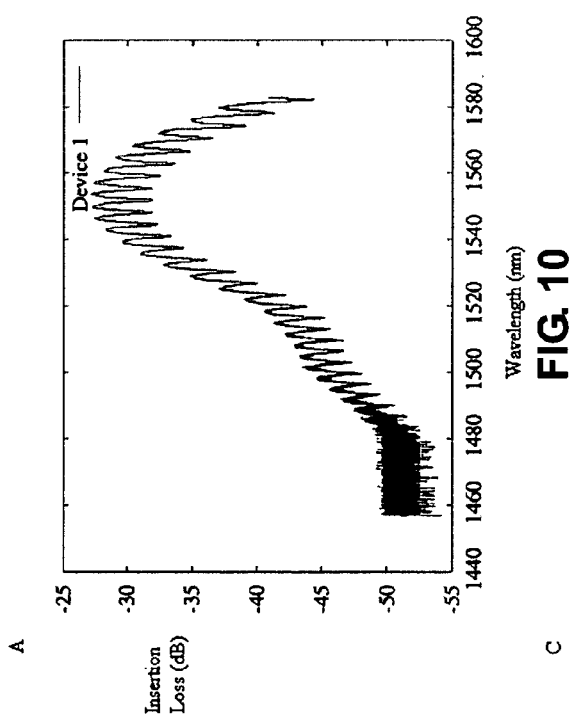
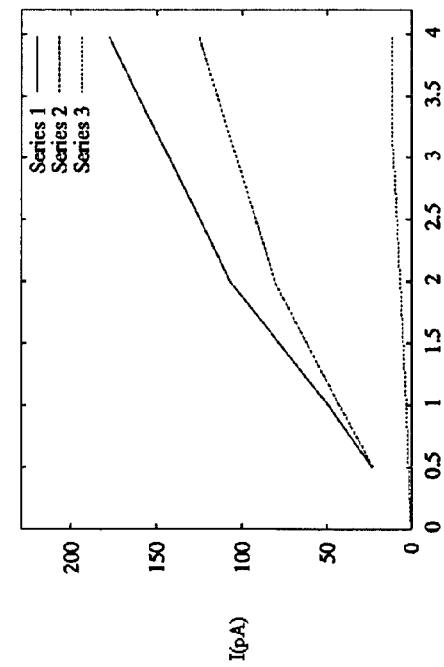
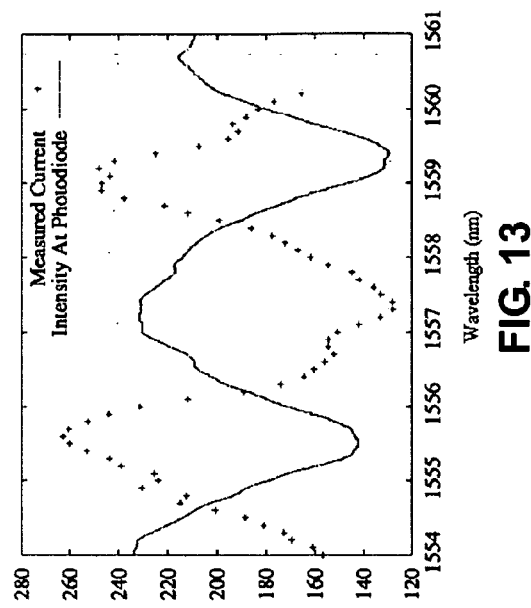
FIG. 10
FIG. 11
FIG. 12
FIG. 13

US 7,373,058 B2

APPARATUS AND METHOD FOR DETECTING OPTICAL RADIATION

CROSS REFERENCE TO RELATED APPLICATIONS

The present application claims the benefit of provisional application 60/673,570 for "A Novel Geometry for the Detection of Optical Radiation" filed on Apr. 21, 2005, provisional application 60/677,403 for "A Novel Geometry for the Detection of Optical Radiation" filed on May 3, 2005 and provisional application 60/691,496 for "A Novel Geometry for the Detection of Optical Radiation" filed on Jun. 17, 2005, all three of which are incorporated herein by reference in their entirety. The present application may also be related to U.S. application Ser. No. 11/146,940 for "Segmented Waveguide Structures" filed on Jun. 7, 2005 and U.S. application Ser. No. 11/280,854 for "Coupled Segmented Waveguide Structures" filed on Nov. 15, 2005, both of which are also incorporated herein by reference in their entirety.

FEDERAL SUPPORT

The invention described herein was made in the performance of work under a Naval Air Warfare Center Aircraft Division contract, grant no. N00421-02-D-3223. The U.S. Government has certain rights in this invention.

BACKGROUND

1. Field

The present disclosure is directed to waveguide structures, and in particular, to an apparatus and method for detecting optical radiation.

2. Related Art

Waveguide-based integrated optics in silicon (see reference [1], incorporated herein by reference in its entirety) provides an ideal platform for concentrating and guiding light at the nanoscale. The high index contrast between silicon and common cladding materials enables extremely compact waveguides with very high mode field concentrations, and allows the use of established CMOS fabrication techniques to define photonic integrated circuits (see references [2-4], incorporated herein by reference in their entirety).

It has recently become possible, by using slotted waveguides (see reference [5], incorporated herein by reference in its entirety), to further concentrate a large fraction of the guided mode into a gap within the center of a silicon waveguide. This geometry greatly magnifies the electric field associated with the optical mode, resulting in electric fields in excess of $10^6$ V/m for continuous-wave, sub-millitwatt optical signals. Moreover, since the slotted geometry consists of two silicon strips which can be electrically isolated, a convenient mechanism for electro-optic interaction is provided. Such waveguides can be fabricated with low loss; the applicants have previously demonstrated -10 dB/cm (see reference [6], incorporated herein by reference in its entirety).

SUMMARY

According to a first aspect, a method for detecting optical radiation is provided, comprising: providing a slot waveguide, the slot waveguide comprising a first portion and a second portion, the second portion being electrically isolated from the first portion; filling the slot waveguide with an electro-optic polymer; inputting optical radiation into the waveguide, the first portion and the second portion of the slot waveguide interacting with an optical field generated by said optical radiation; and measuring a voltage difference between the first portion and the second portion.

According to a second aspect, a method for detecting optical radiation is provided, comprising: providing a slot waveguide, the slot waveguide comprising a first portion and a second portion, the second portion being electrically isolated from the first portion; filling the slot waveguide with a nonlinear chi-2 material; inputting optical radiation into the waveguide, the first and second portion of the slot waveguide interacting with an optical field generated by said optical radiation; and measuring a voltage difference between the first portion and the second portion.

According to a third aspect, an optical detector is provided, comprising: a waveguide, the waveguide comprising a first component part and a second component part the first component part and the second component part forming an electrical output of the detector; the first component part and the second component part being electrically isolated from each other and adapted to interact with an optical field generated by optical radiation; a nonlinear optical material between the first component part and the second component part, said material providing a mechanism for nonlinear conversion of said optical radiation to an electrical signal; and an arrangement to compare an electrical condition of the first component part with an electrical condition of the second component part, the arrangement being in contact with the first component part and the second component part.

A first advantage of the present invention is that both the high intensity of the optical field and the close proximity of the electrodes are exploited, for several purposes. First, detection of optical signals via direct conversion to electrical energy is shown, by means of nonlinear optical rectification. Nonlinear optical rectification is discussed, for example, in reference [7], incorporated herein by reference in its entirety.

A device in accordance with the present disclosure comprises a split ring resonator with an electro-optic polymer based $\chi^2$ (chi-2) material deposited as a cladding. Materials of this kind are discussed, for example, in [8, 9], both incorporated herein by reference in their entirety. Inside the slot, the high optical field intensity creates a standing DC field, which creates a virtual voltage source between the two electrodes (e.g. silicon electrodes), resulting in a measurable current flow, in the absence of any external electrical bias. One example of such a material is a poled electrooptic polymer. Such a material is deposited in an unordered state, as the orientation of the chromophores in the polymer has no intrinsic order. Such a material can be made to develop a second order (chi-2) nonlinear optical moment through the process of poling. Poling generally consists of heating the material above or near its glass transition temperature, and then a voltage being applied to create an electric field across the polymer. This electric field can be developed from integrated electrodes, or from a field discharged from an emitter tip. In the case of the use of an external emitter tip, the process is generally referred to as 'corona poling'. In either case, the field on the polymer forces the chromophores into an ordered state; when the temperature of the substrate is reduced below the glass transition, this ordering, and thus the associated second order nonlinear moment, is 'frozen in' to the material.

Though optical rectification has been observed in electro-optic polymers elsewhere (see reference [10], incorporated herein by reference in its entirety), typically instantaneous optical powers on the order of 1 kW are needed for observable conversion efficiencies, often achieved with pulsed lasers. In accordance with the present disclosure, measurable conversion with less than 1 mW of non-pulsed input can be obtained, obtained from a standard, low power tunable laser near 1500 nm.

Also standard Pockels' effect based modulation (see reference [11], incorporated herein by reference in its entirety) can be obtained, which is similarly enhanced by means of the very small scale of the device according to the disclosure. The close proximity of the electrodes, and ready overlap with the optical mode, causes an external voltage to produce a far larger effective electric modulation field, and therefore refractive index shift, than would be obtained through conventional waveguide designs (see reference [12], incorporated herein by reference in its entirety). The applicants have shown this through the tuning of the resonance frequencies of a slot waveguide ring resonator. Reference can also be made to U.S. application Ser. No. 11/280,854 for "Coupled Segmented Waveguide Structures" filed on Nov. 15, 2005, incorporated herein by reference in its entirety.

By means of the nanoscale slotted waveguide geometry in accordance with the present disclosure, massive enhancements of the optical field have been obtained over what is generally achieved in fibers or in free space optics. That has in turn enabled the applicants to exploit nonlinear optical processes that are typically only available in the kW regime in fibers or free space in the sub-mW regime. This difference is so considerable that the applicants believe it represents a change in kind for the function of nonlinear optical devices; it may be possible to someday construct a practical, low-power detector based on nonlinear optical rectification. In addition, the applicants expect this hybrid material system to provide a means for creating compact devices that exploit other nonlinear phenomena on-chip.

Optical rectification based detectors might have many advantages over currently available technology. In particular, such detectors would probably be able to function at a higher intrinsic rate than the typical photodiode in use, as the optical rectification process occurs at the optical frequency itself, on the order of 100 THz in WDM systems. The absence of an external bias, and ability to generate a voltage or current source on-chip powered directly by the optical field without the application of any external electrical energy source, may prove to be of great utility. The applicants also do not believe that a device based on nonlinear optical rectification would suffer from the limitation of a dark current. This in turn might mean that current WDM and other optical systems could function with lower optical power, providing numerous benefits. Similarly, presence of enhanced modulation using these waveguide geometries may also lead to useful components in future communications systems.

The applicants are also optimistic that these detectors may find uses at wavelengths well outside of the telecommunications bands, since there is no intrinsic reason that detectors using the same principle of detection could not work at much shorter and much longer wavelengths. In particular, there are few practical detectors in the mid- and long-wave infrared regimes, and it is possible that optical-rectification based detectors utilizing the same ideas presented here could be of great technological importance. Lastly, because these detectors require no bias voltage and will thus exhibit little or no leakage current, it is possible that they might find applications in applications similar to those where long-wavelength photomultiplier tubes are currently used.

Further, because the devices of the present disclosure can be fabricated in planar, electronics grade silicon-on-insulator (SOI), using processes compatible with advanced CMOS processing, it is likely the devices based on these principles could be built cheaply. It is the applicants' hope that electrically active slotted waveguides can someday become a platform of choice for practical linear and nonlinear integrated optics.

BRIEF DESCRIPTION OF THE DRAWINGS

FIGS. 8 and 9 show Tables summarizing experiments performed by the applicants to test devices in accordance with the present disclosure.

FIGS. 10 and 11 show optical transmission curves for two detector devices in accordance with the present disclosure.

FIG. 12 shows curves of current vs. power for three measurement series. Series 1 is a first device with wavelength at 1549.26 nm, on a resonance peak. Series 2 is the first device with wavelength at 1550.5 nm, off resonance. Series 3 is a second device with the wavelength at 1551.3, on resonance.

FIG. 13 shows the output current of the device in accordance with the present disclosure as a function of wavelength, overlaid with the transmission spectrum. The transmission spectrum has been arbitrarily rescaled to show the contrast.

DETAILED DESCRIPTION

Figure 1:
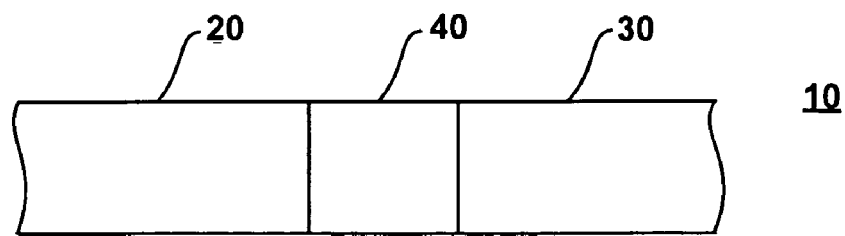
FIG. 1 shows a schematic cross-sectional view of a waveguide in accordance with the present disclosure.

FIG. 1 shows a schematic cross-sectional view of a slot waveguide in accordance with the present disclosure. The slot waveguide 10 comprises a first portion 20 and a second portion 30, together with a region 40 between the portions 20 and 30. The region 40 is filled with an electro-optic polymer, for example a $\chi^2$ material. The dimensions of the region 40 are preferably in the nanoscale range.

Figure 2:
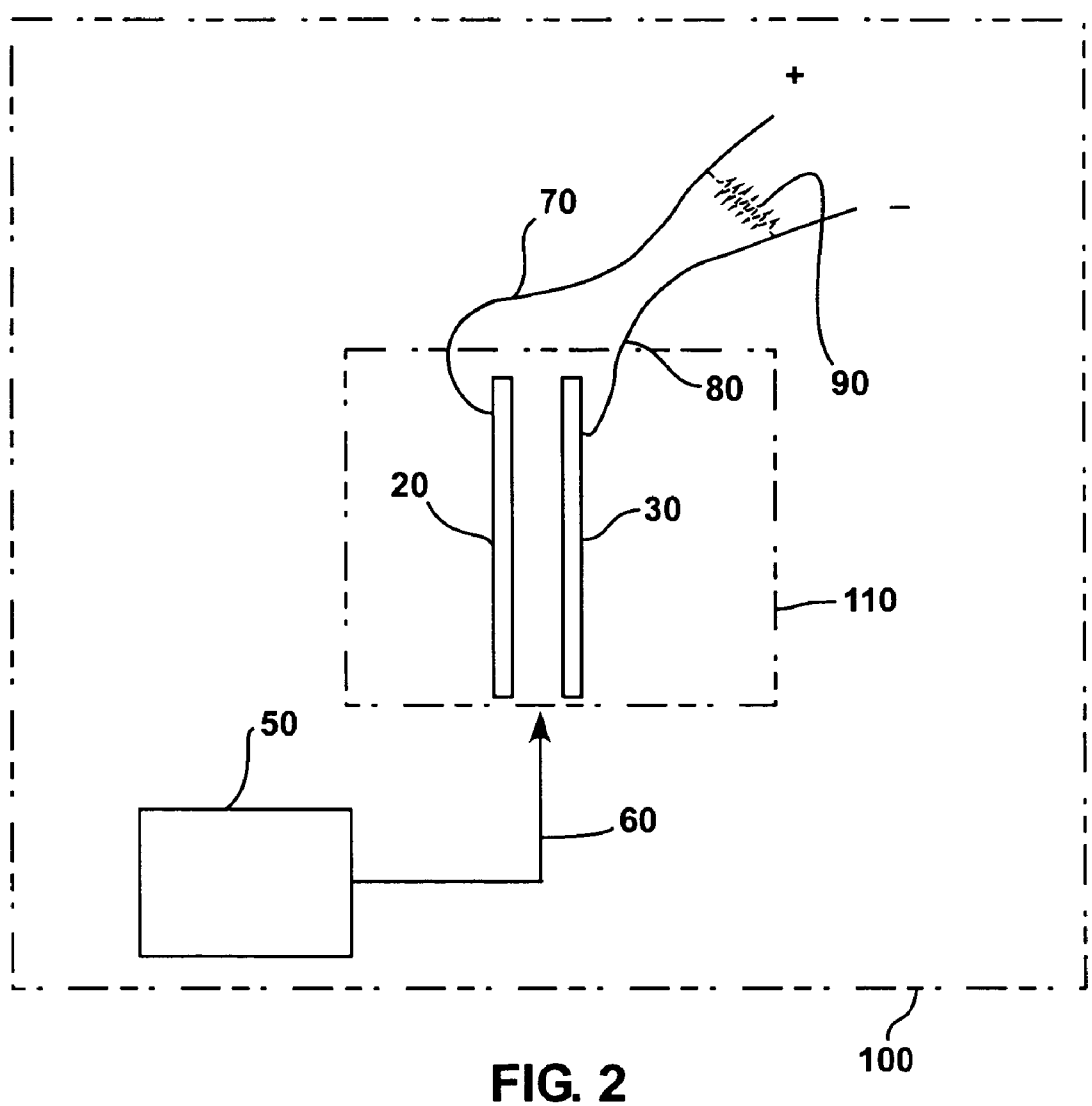
FIG. 2 shows an arrangement of the optical detector in accordance with the present disclosure.

FIG. 2 is a further schematic view showing an arrangement of an optical detector in accordance with the present disclosure, where an input device 50 inputting an optical signal 60 is also shown, together with a measuring arrangement 70, 80 (e.g., electrical contact pads) to comparatively measure the electrical condition of the portions 20, 30 (e.g., to measure a voltage difference between the the portions 20 and 30). The detector can also comprise a device for confirming electrical contact of the contacts, e.g. a shunt resistor 90. The detector can be part of an arrangement 100, such as an on-chip electronic arrangement or a silicon-on-insulator device, both of them either comprising or not comprising the input device 50. Further, the waveguide portion shown in FIG. 2 can be part of a resonator 110, such as a linear resonator, oval resonator, and photonic crystal resonator. The voltage difference can be, for example, a DC voltage difference, an AC voltage difference or RF voltage difference. The detector can also be used as a detector of near, mid or far-infrared or Terahertz radiation, or as a low-noise photodetector. Further, the detector can be used as an ultra-high speed (e.g. >10 GHz) photodetector or for applications similar to photomultiplier tubes. In particular in the infrared and Terahertz wavelength regimes, the waveguide might be constructed out of metals, since these can provide both low loss guiding and electrical contacts in these wavelength regimes.

The device according to the above FIGS. 1 and 2 allows conversion of optical power (elements 50, 60) into electrical voltage or current (output 70, 80) with optical rectification by using an electrically contacted slot waveguide geometry (waveguide 20, 30, 40). The slot waveguide provides substantial optical field enhancement. In this way, the conversion efficiency of optical rectification is enhanced by using a high index contrast waveguide to concentrate the light to a small volume, taking advantage of the large optical field concentrations available in slot waveguides or nanoscale high index contrast waveguides, such as those used in a split ring resonator. Therefore, the small gaps available in split waveguides are used to take advantage of conduction in cladding materials that exist only over short length scales, to enhance the performance of optical rectification based detection. The device according to the above FIGS. 1 and 2 can be used as part of an on-chip electronic arrangement, possibly including amplifiers or transistors, and/or as part of a silicon-on-insulator device.

Waveguides suitable for the above arrangement can be made, for example, of silicon, GaAs, InP, GaN, GaP, III-V material, quaternary optical material, lithium niobate, or other high index and low loss material. As a cladding material to fill the region 40 of FIG. 1, electro-optic polymers or other materials exhibiting a sufficiently large $\chi^2$ moment can be used. Poling of the $\chi^2$ materials is obtained by use of DC or low frequency electric fields, using the same structure both as the poling electrodes and the operating electrodes of the device. As later discussed in more detail, poling can be performed at room temperature, or below the temperature at which the $\chi^2$ material can conventionally be poled—this being made possible by the large DC field concentrations per volt available in the compact waveguide geometries according to the present disclosure. In other words, a DC or low frequency field is used to modify the strength of the $\chi^2$ moment after poling, at room temperature or below the normal temperature of the nonlinear material in question. Embodiments of the above waveguide structures can include, for example, single waveguides, interferometers, ring, linear, oval or photonic crystal resonators. The nonlinear material can also be a chi-2 material other than a polymer, such as a dendrimer material or a material comprising quantum-dot doped polymer matricies. The waveguide of FIGS. 1 and 2 can also be a non-slot waveguide, for instance making use of plasmon based guiding which provides substantial optical field enhancement.

Waveguide Fabrication

The devices described in this paper can be fabricated in electronic grade silicon-on-insulator (SOI) (see reference [13], incorporated herein by reference in its entirety) with a possible top layer thickness of 110 nm and an oxide thickness of 1.3 microns. The silicon layer is subsequently doped to approximately $10^{19}$ phosphorous atoms/cm$^3$, yielding resistivities after dopant activation of ~0.025 ohm-cm. Electro-optic (EO) polymers were then spin-deposited onto the waveguide structures and subsequently poled by using a high field applied across the slot in the waveguide.

Lithography was performed by applicants using a Leica EBPG 5000+® electron beam system at 100 kv. Prior to lithography, the samples were manually cleaved, cleaned in acetone and isopropanol, baked for 20 minutes at 180° C., coated with 2 percent HSQ resist from Dow Corning Corporation®, spun for two minutes at 1000 rpm, and baked for an additional 20 minutes. The samples were exposed at 5 nm step size, at 3500 µC/cm$^2$. The samples were developed in AZ 300 TMAH® developer for 3 minutes, and etched on an Oxford Instruments PLC Plasmalab 100® with chlorine at 80 sccm, forward power at 50 W, ICP power at 800 W, 12 mTorr pressure, and 33 seconds of etch time. The samples were then implanted with phosphorous at normal incidence, 30 keV energy, and 1×10$^{14}$ ions/cm$^2$ density. The sample was annealed under a vacuum at 950° C. in a Jipilec Jetstar® rapid thermal annealer, and the samples were dipped in buffered hydrofluoric in order to remove the remnants of electron beam resist from the surface.

After initial optical testing, the samples were coated with YLD 124 electro-optic polymer, and in one case with dendrimer-based electrooptic material. The samples were stored under a vacuum at all times when they were not being tested, in order to reduce the chances of any degradation.

Synthesis of YLD 124 Coating Solution

Figure 3:
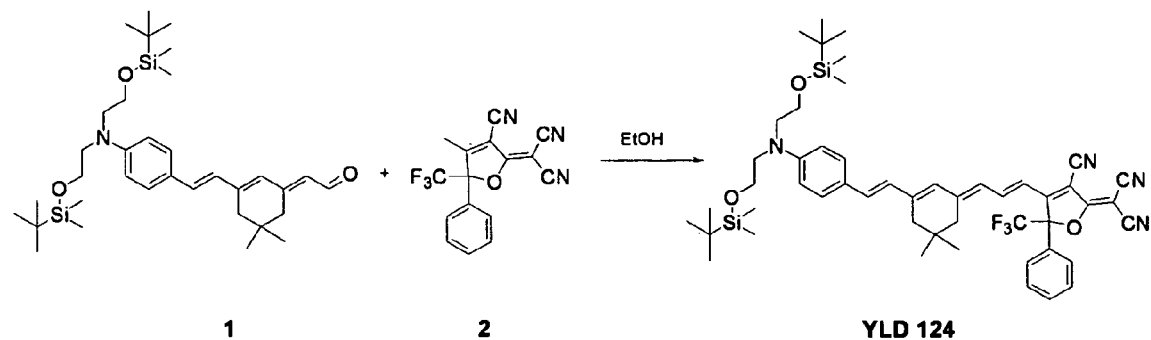
FIG. 3 is a chemical diagram showing compounds used to synthesize a coating solution to be used in the present disclosure.

FIG. 3 is a chemical diagram showing compounds 1 and 2 used to synthesize a YLD 124 coating solution. To a solution of 0.56 g (0.96 mmol) of compound 1 (see also reference [12], incorporated herein by reference in its entirety) and 0.36 g of compound 2 (1.1 mmol) in 1.5 mL of THF was added 6 mL of absolute ethanol. The mixture was stirred for 6 hrs at room temperature. The precipitate was collected by filtration and washed by ethanol and methanol. The crude product was dissolved in minimum amount of $CH_2Cl_2$. The resultant solution was added dropwisely to 100 mL of methanol. The product (0.76 g) was collected as dark green precipitate. Yield was 90%. $^1$H NMR (CDCl$_3$): 8.05 (t, J=13.6 Hz, 1H ), 7.45-7.58 (m, 5 H), 7.38 (d, J=8.9 Hz, 2H) 6.93 (d, J=15.9 Hz, 1 H) 6.79 (d, J=15.9 Hz, 1H), 6.70 (d, J=8.9 Hz, 2H), 6.40-6.25 (m, 3 H), 3.80 (t, J=5.8 Hz, 4H), 3.59 (t, J=5.8 Hz, 4H), 2.42 (s, 2H), 2.40 (s, 2H), 1.04 (s, 3H), 0.98 (s, 3H), 0.90 (s, 18H), 0.04 (S, 12H). MS (ESP): 879.48 (M+H). UV-Vis (THF): 765 nm. m.p. 173° C.

One part of YLD124 was mixed with three parts of APC (Poly[Bisphenol A carbonate-co-4,4'-(3,3,5-trimethylcyclohexylidene)diphenol carbonate]). The mixture was dissolved in cyclopentanone. The total solid content (YLD124 and APC) is about 12%. The resultant solution was filtered through a 0.2 µm filter before used on device.

Optical Rectification Based Detection

FIGS. 4-7 detail the geometry of the photodetectors and filters, including a cross section of the slotted waveguide.

Figure 4:
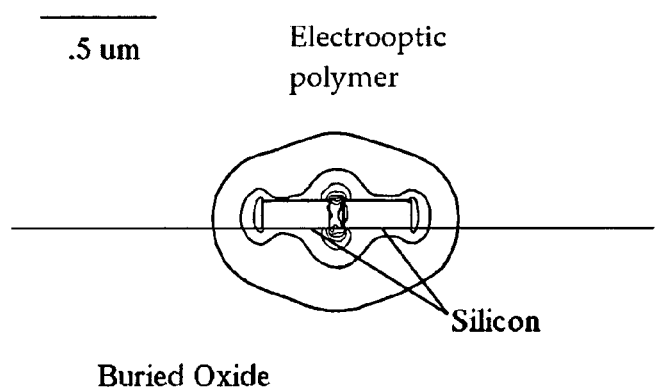
FIG. 4 shows a schematic cross-sectional view of a slot waveguide in accordance with the disclosure.

In FIG. 4 (similar to FIG. 1), the optical mode was solved using a finite-difference based Hermetian Eigensolver, and has an effective index of approximately 1.85 at 1500 nm.

Figure 5:
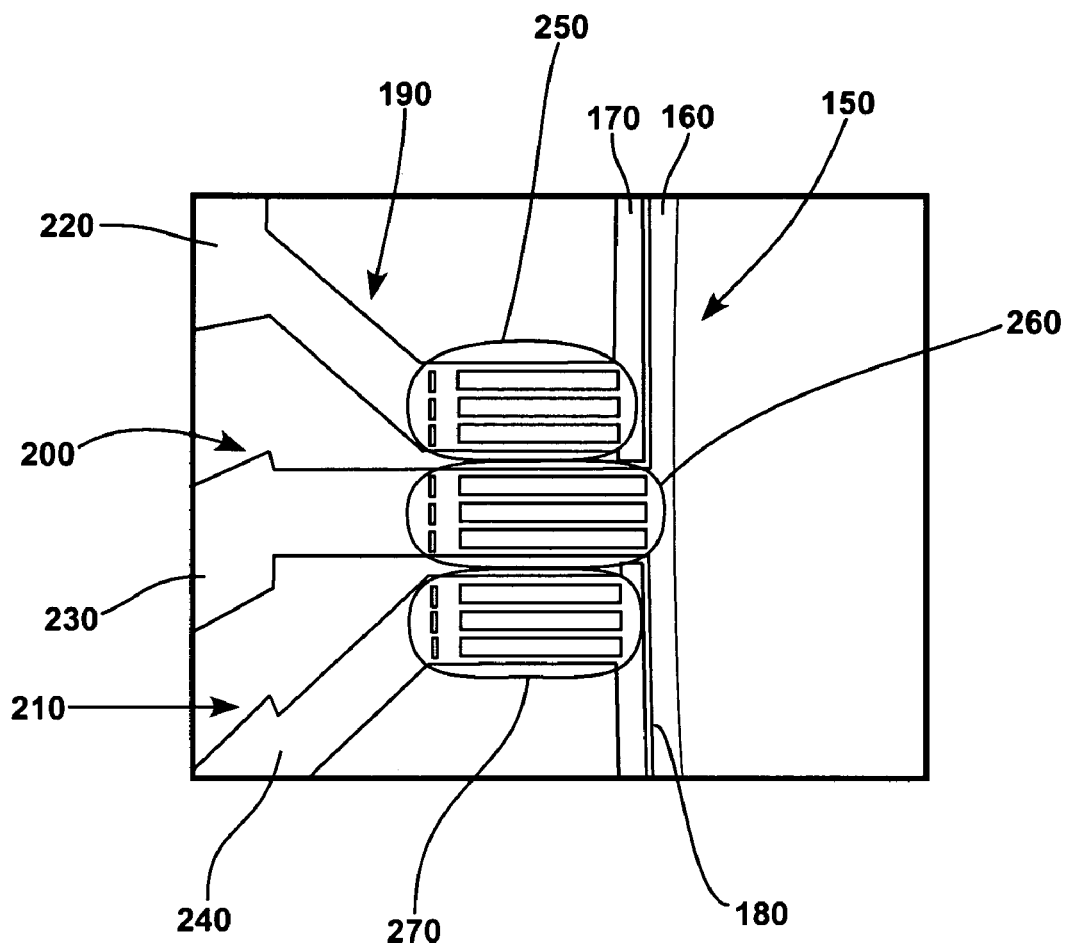
FIG. 5 shows shows a top view of a portion of a slotted ring resonator connected with segmented waveguides.
Figure 6:
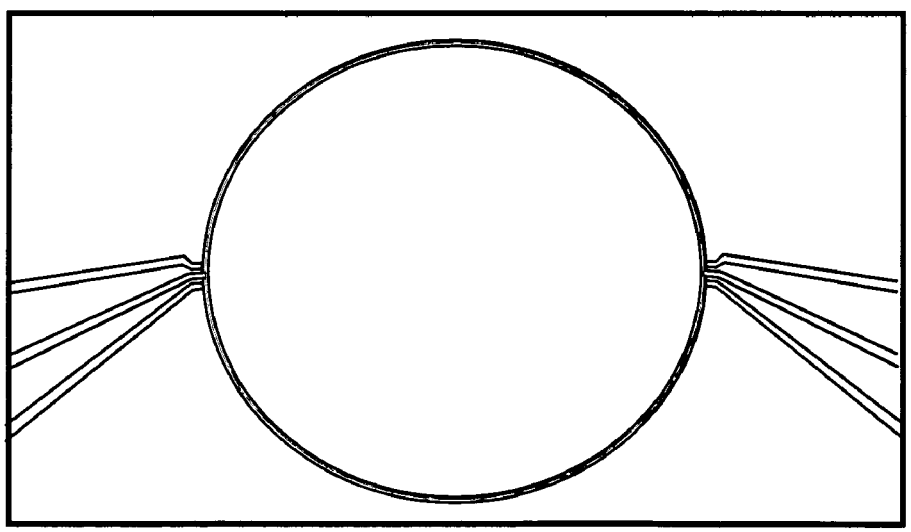
FIG. 6 is a top view of the entire ring resonator connected with input waveguides acting as electrical contact structures.

Most of the electric field is parallel to the plane of the chip, and it is possible to contact both sides of the slot in a slotted ring resonator, as shown in FIGS. 5 and 6. Electrically isolated contacts between the silicon rails defining the slotted waveguide introduce only about 0.1 dB of optical loss. Segmented waveguides are described in detail in U.S. application Ser. No. 11/146,940 and U.S. applicaiton Ser. No. 11/280,854, also enclosed herein by reference in their entirety. The 'segmented' portion of the waveguide is a lateral extension or 'grating' of the waveguide, to be used as an electrical contact. The extension is usually lithographically defined during the same lithographic step as the waveguide definition etch.

FIG. 6 shows a top view of a coupling between a ring resonator and segmented waveguides. The coupling allows both sides of the slot ring resonator to be electrically contacted.

In particular, FIG. 5 shows a portion of a ring resonator 150, comprising an inner stripe or ring 160 and an outer stripe or ring 170 separated by a small gap 180. The inner/outer stripes 160/170 are conceptually equivalent to the portions 20/30 of FIGS. 1 and 2, while the gap 180 is conceptually equivalent to the gap 40 of FIGS. 1 and 2. Also shown are waveguides 190, 200, 210 comprising non-segmented waveguide portions 220, 230, 240 and segmented waveguide portions 250, 260, 270. The segmented waveguide portions comprise a plurality of segments or contact bars, usually having a predetermined periodicity p, i.e. distance between two adjacent segments. The waveguides are usually located on a substrate. In accordance with a SOI technique, the waveguides can be made of silicon, while the substrate can be made of silicon dioxide, $SiO_2$.

Figure 7:
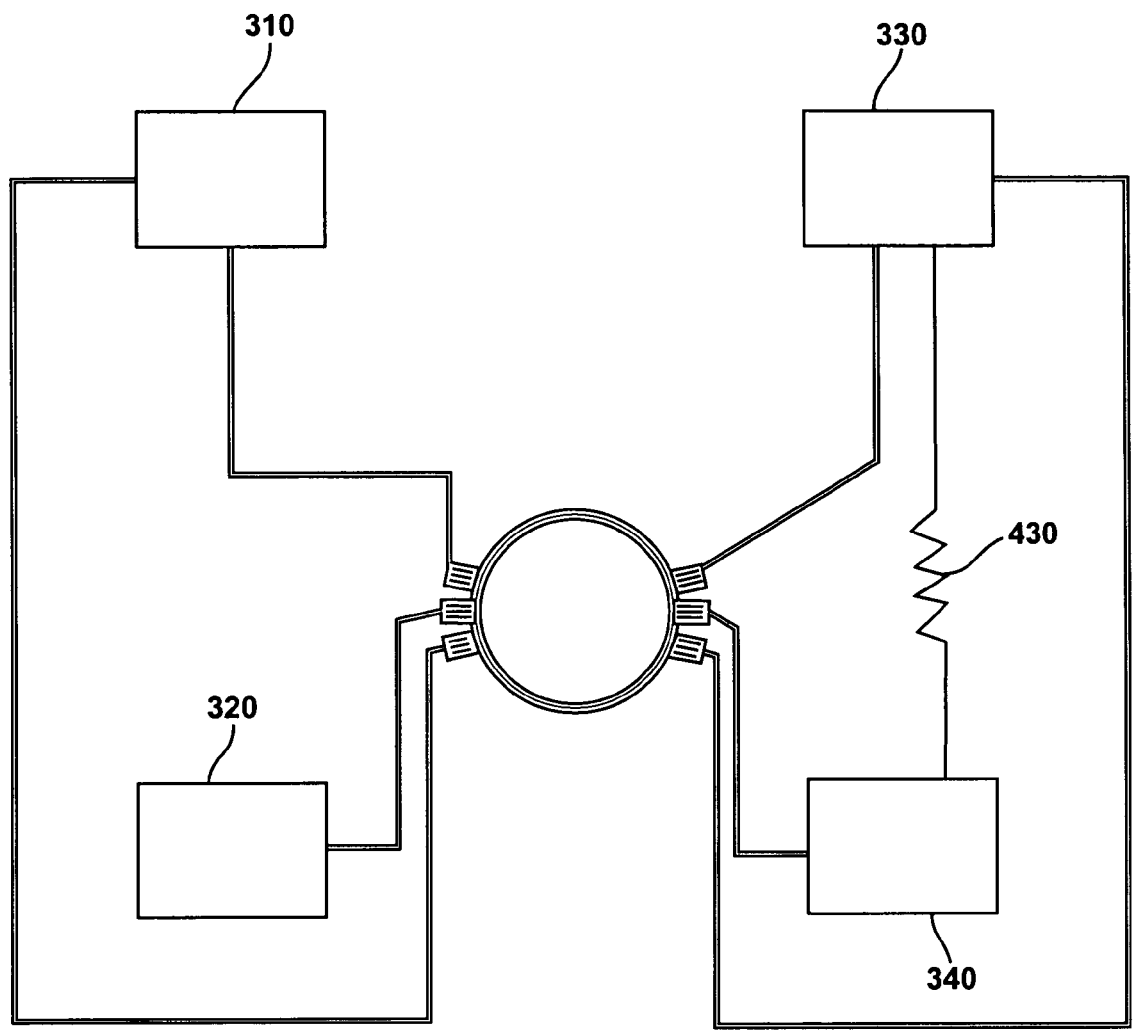
FIG. 7 is a diagram showing the logical layout of the circuit shown in FIGS. 5 and 6.

FIG. 7 details the layout of a complete slotted ring resonator, with two contact pads 310, 330 connected to the outer half of the ring, and two pads 320, 340 electrically connected to the inner half of the ring. A shunt resistor 430 provides a means of confirming electrical contact, and typical pad-to-pad and pad-to-ring resistances range from 1 M$\Omega$ to 5 M$\Omega$. FIGS. 5-7 are also discussed in U.S. Ser. No. 11/280,854, incorporated herein by reference in its entirety.

Testing was performed with single-mode polarization maintaining input and output fibers, grating coupled (see reference [14], incorporated herein by reference in its entirety) to slotted waveguides with an insertion loss of approximately 8 dB. Optical signal was provided from an Agilent 81680a® tunable laser and in some cases an erbium doped fiber amplifier from Keopsys® Corporation. A continuous optical signal inserted into a poled polymer ring results in a measurable current established between the two pads, which are electrically connected through a pico-Ammeter. In the most sensitive device, a DC current of ~1.3 nA was observed, indicating an electrical output power of ~$10^{-9}$ of the optical input power ($5 \times 10^{-12}$ W of output for approximately 0.5 mW coupled into the chip). Control devices, in which PMMA or un-poled EO material was substituted, show no photocurrent.

The fact that there is no external bias applied to this system or indeed any energy source, other than the optical signal, demonstrates conclusively that power is being converted from the optical signal. To establish that the conversion mechanism is actually optical rectification, the applicants performed a number of additional experiments. First, a steady bias was applied on the chip for several minutes, as shown in the Table of FIG. 8, and observed a substantial change in the photoresponse of the device. This change depends on the polarity of the bias voltage, consistent with the expected influence of repoling of the device in-place at room temperature. Specifically, if the external bias was applied opposing the original poling direction, conversion efficiency generally decreased, while an external bias in the direction of the original poling field increased conversion efficiency.

To further understand the photo-conversion mechanism, 5 EO detection devices were poled with both positive and negative polarities, thus reversing the direction of the relative $\chi^2$ tensors (FIG. 9). For these materials, the direction $\chi^2$ is known to align with the polling E field direction (see references [12]-[16] also incorporated herein by reference in their entirety) and the applicants have verified this through Pockels' effect measurements. In all but one case, it can be observed that the polarity of the generated potential is the same as that used in poling, and the +V terminal during poling acts as the −V terminal in spontaneous current generation, as shown in the Table of FIG. 9. Furthermore, the polarity of the current is consistent with a virtual voltage source induced through optical rectification. It should be noted that these devices decay significantly over the course of testing, and that in one case the polarity of the output current was even observed to spontaneously switch after extensive testing. However, their initial behavior after polling seems largely correlated to the $\chi^2$ direction.

A number of experiments were performed to produce negative results, and to exclude the possibility of a mistaken measurement of photocurrent. The power input to the chip was turned on and off by simply moving the fiber array away from the chip mechanically, without changing the circuit electrically, and the expected change in the electrical output signal of our detector was observed. A chip was coated in polymethylmethacrylate and tested, resulting in no observed photocurrents. Also, the applicants tested some of the devices shown in the Table of FIG. 9 before any polling had been performed; no current was observed.

To establish a quantitative relationship between the laser power in the EO material and the photo-current, the applicants used a lock-in amplifier, and achieved a noise floor of about 0.2 pA. This resulted in a reasonable dynamic range for the 10-200 pA photocurrent readings.

FIGS. 10 and 11 show optical transmission curves for typical devices. FIG. 12 shows several traces of output current versus input laser power, and a fairly linear relationship is observed. The relationship I=cP, where I is the output current, P is the input laser power, and c is a proportionality constant ranging from 88+/−10 pA/mW at a 1 kHz lock-in measurement and when the wavelength is on resonance, changing to a lower value of 58+/−8 pA/mW off resonance for our best device. It is important to note that current was easily observed with only a pico-ammeter, or by simply connecting an oscilloscope to the output terminal and observing the voltage deflection.

As another demonstration of the dependence of the output current on the amount of light coupled into the resonator, the applicants also tuned the laser frequency and measured the output current. As can be seen in FIG. 13, the amount of output current increases as the laser is tuned onto a resonance peak. This again indicates that the overlap between the EO polymer in the resonator and the optical mode is responsible for the photo-current. The applicants have overlaid a photocurrent vs. wavelength response scan to show the resonance peaks for comparison. It should not be surprising that a small photocurrent is still measured when the laser is off resonance, since the amount of radiation in a low-Q ring resonator is non-negligible even off resonance. It is also worth noting that the applicants have successfully observed this detector function at speeds up to 1 MHz, without significant observable rolloff. This is again consistent with optical rectification.

Pockels' Effect Modulation

At DC, the Pockels' effect was measured by applying varying voltages to the device and observing the device transmission as a function of wavelength. For devices with working modulation, the resonance peaks were shifted, often to a noticeable degree. To counter the systemic drift due to temperature fluctuations, a series of random voltages were applied to a device under test and the wavelength responses noted. The intersection of a resonance peak and a certain extinction, chosen to be at least 10 dB above the noise floor, was followed across multiple scans. A 2 d linear regression was performed, resulting in two coefficients, one relating drift to time, and one relating drift to voltage.

At AC, a square wave input voltage was put across the device. The input wavelength was tuned until the output signal had the maximum extinction. It was determined what power levels were implied by the output voltage, and then the observed power levels were fit to a wavelength sweep of the resonance peak. This readily allowed the tuning range to be calculated. The applicants successfully measured AC tuning up to the low MHz regime; the limitation at this speed was noise in the electrical driving signal path, not, as far as the applicants can tell, any rolloff in the modulation process itself.

Figure 14:
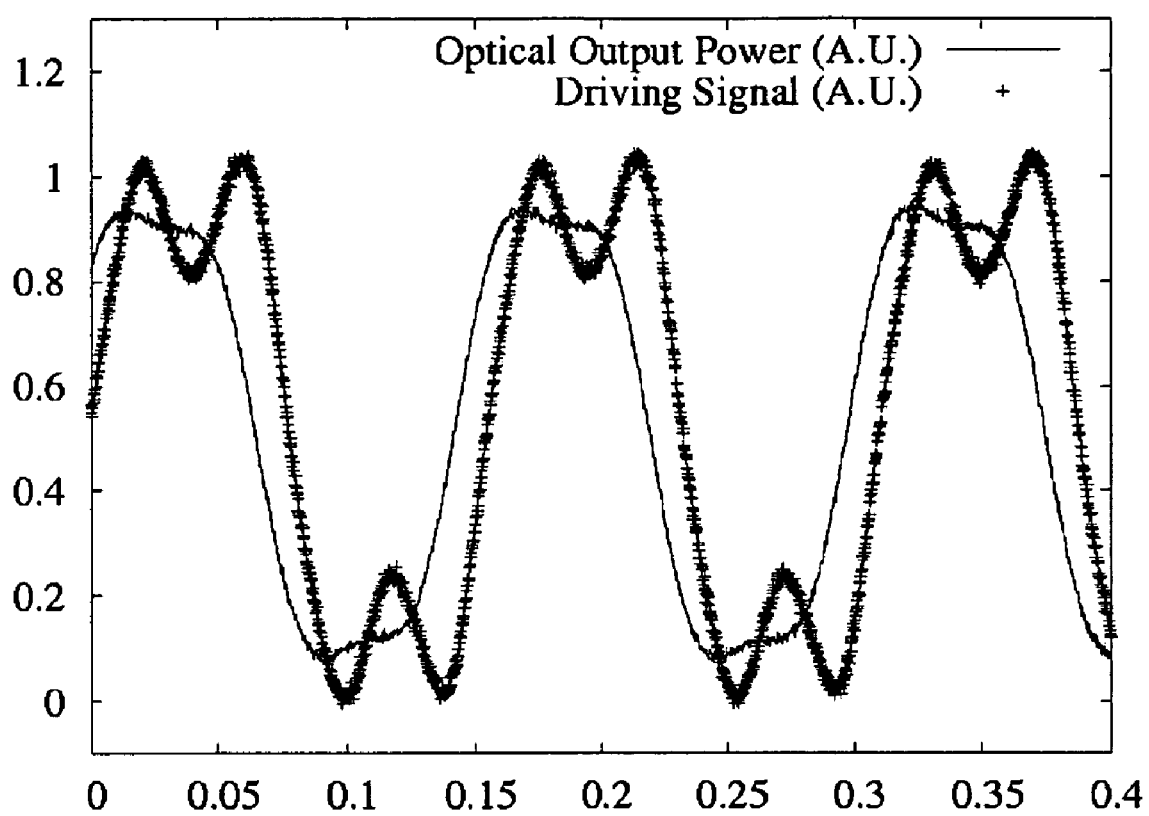
FIG. 14 shows a bit pattern generated by Pockels' effect modulation. The vertical axis represents input voltage and output power, both in arbitrary units. The horizontal axis represents time in microseconds. The voltage swing on the input signal is 20 volts.

In FIG. 14, a result at approximately 6 MHz for the use of these structures as resonantly enhanced electro-optic modulators is shown. These experiments clearly demonstrate that low-voltage electro-optic tuning and modulation can be achieved in the same geometries as have been described for photodetection. It should be emphasized that these devices are not optimized as modulators. By increasing the Q of the resonators to exceed 20,000, which has been demonstrated elsewhere (see reference [6], incorporated herein by reference in its entirety), it will be possible to achieve much larger extinction values per applied voltage.

By utilizing new dendrimer-based electrooptic materials (see reference [14], incorporated herein by reference in its entirety), the applicants we have achieved 0.042±0.008 nm/V, or 5.2±1 GHz/V for these rings. This implies an $r_{33}$ of 79±15 pm/V. This result is better than those obtained (see reference [12], incorporated herein by reference in its entirety), for rings of 750 micron radius, which the applicants believe to be the best tuning figure published to date. By contrast, the applicants' rings have radii of 40 microns. The applicants credit the improvement over the previous results mainly to the field enhancement properties of the waveguide geometry in accordance with the present disclosure.

Optical Rectification Theory

The general governing equation of nonlinear optics is known (see reference [15], incorporated herein by reference in its entirety) to be:

$$D_i = \epsilon_0(\epsilon_r E_i + \chi_{ijk}^2 E_j E_k + \ldots) \quad (1)$$

The EO polymers in accordance with the present disclosure are designed to exhibit a relatively strong $\chi^2$ moment, ranging from 10-100 pm/V. In most $\chi^2$ EO polymer systems, the Pockel's effect is used to allow the electric field (due to a DC or RF modulation signal) to modify the index of refraction. In such systems the modulating electric field is typically far in excess of the electric field from the optical signal and the term that produces the material birefringence is the only term of importance in the above equation.

The waveguides in accordance with the present disclosure, however, have a very large electric field as most of the radiation is confined to a 0.01 square micron cross section. It can be shown that the electric field is approximately uniform in the transverse direction, with a magnitude of $$10^8 \sqrt{P} \text{V/m} \quad (2)$$

where P is the optical power in Watts. At large optical fields, the non-Pockels terms involved in the governing nonlinear equation cannot be neglected. For coherent input power, at a given location in the waveguide, the optical field is:

$$E_{optical}(t) = A\cos(wt + \theta) \quad (3)$$

The term $$E_{optical}^2 = \frac{A^2}{2}\cos(2(wt + \theta)) + \frac{A^2}{2} \quad (4)$$

will therefore contain not only frequency doubled components, but also a "DC" component. This phenomenon is known as optical rectification (see reference [16], incorporated herein by reference in its entirety). The applicants believe that this DC component provides a likely explanation for the photo-current that is observed. Because the electrodes (the two sides of the slot waveguide) have been positioned at precisely the bounds of the induced field, the effect of optical rectification takes a small slice of the optical power and converts it into a virtual voltage source between the two arms. This in turn induces a current that can be measured and is linearly proportional to the input power $E_{optical}^2$.

Now let us consider the solution to Maxwell's equation in more detail. The system of the present disclosure can be approximated for this discussion as having two dimensions, with both the optical and DC electric field in the x direction and propagation in the z direction, for instance. Let us imagine that the $\chi^2$ is nonzero and small for a tiny region from 0 to w in the x dimension. $\chi^2$ is sufficiently small that the electric field due to the optical mode is still uniform. Let us imagine the system has no charge anywhere. The optical electric field can be written as $E = Ae^{ikz-iwt} + c.c.$ where c.c. indicates a complex conjugate. Let us further assume that the rectified DC field is of real amplitude C and uniformly directed in the x dimension on (0, w), and 0 elsewhere.

Other than the divergence condition, Maxwell's equations are still satisfied by this system. But at the edge of an interface on the interior, the DC frequency component of $D_x$, the displacement electric field, is discontinuous. At x=0, we have:

$$D_x^- = 0 \quad (5)$$

$$D_x^+ = \epsilon_0(\epsilon_r C + \chi^2 C^2 + 2\chi^2 |A|^2) \quad (6)$$

We neglect $2C^2$ because we expect the amplitude of the rectified field to be far smaller than that of the optical field. Clearly, the boundary condition of zero divergence can only be satisfied if Dx+ is 0. Then, $$C = -\frac{2\chi^2}{\epsilon_r}|A|^2 \quad (7)$$

So we see that the direction of the rectified field is reversed compared to the direction of $\chi^2$. Note that there is no particular direction associated with the optical field as it is continually oscillating. As we have seen, this rectified DC field would then, if acting as a virtual voltage source, create an effective positive terminal on the positive polling terminal.

Analysis of Data for Optical Rectification

To derive the magnitude of the expected photocurrent, we assume that the $\chi^2$ magnitude relating to the Pockels' effect is similar to that for optical rectification. A measurement of $\chi^2$ can then be obtained from the direct observation of the electro-optic coefficient by the standard measurements described earlier. The typical measured tuning value of 2 GHz/V yields approximately 50 pm/V.

In the best case, devices with 6 dBm of input power returned approximately 1.4 nA of current. With Qs ranging from 3 k to 5 k, and assuming approximately 7 dB of insertion loss in the input grating coupler on one of the chips, in the best case as much as 0 dBm might be circulating in a resonator on resonance. This implies a peak electric field due to the optical signal of approximately $3.1 \times 10^6$ V/m. The induced static nonlinear polarization field is then nearly 1000 V/m, which amounts to a voltage drop of $14 \times 10^{-5}$ V across a 140 nm gap. If this voltage is assumed to be perfectly maintained, and the load resistance is assumed to be 5 M, then 28 pA would be generated, about a factor of 100 less than is observed in the largest measurement made, but within a factor of 20 of the typical measurement of 352 pA for 6 dBm of input. Significantly, because the generated current is quadratic in E, it is clear that the current will be linearly proportional to the input intensity. This is in accordance with the applicants' observations. The best results for optical rectification were obtained with YLD/APC polymer, whereas the best Pockels' effect results were obtained with the dendrimer materials.

Significantly, the sign of the output current matches that which would be predicted by nonlinear optical rectification, as predicted in section 4.1. Specifically, since positive current emanates from the positive terminal, the rectified E field has a sign reversed from the $\chi^2$ and the polling E field. It should be noted that it is a well established fact with these materials that the $\chi^2$ direction tends to align with the direction of the polling E field. Because of this, the rectified field acting as a voltage source will produce an effective positive terminal at the terminal that had the positive polling voltage.

The current generation mechanism is not yet fully understood. In particular, it is not clear what provides the mechanism for charge transport across the gap. The APC material in which the nonlinear polymer is hosted is insulating, and though it does exhibit the photoconductivity effect due to visible light, it is unclear whether it can for near-infrared radiation. Photoconductivity due to second harmonic generation may play a role in this effect. It is certainly the case, however, that current flows through this gap; that is the only region in the entire system where an electromotive force exists. Also, photoconductivity alone is not adequate to explain the reversal of the current coming off of the detector devices when the poling direction is reversed, nor the conversion of the optical input into directed current in general. The only mechanism to the applicants' knowledge that adequately explains this data is optical rectification.

If one assumes that it will be possible to achieve a 10× improvement in the Q's of the resonators, while still getting more than 10 dB of extinction, then the intensity circulating in such a ring would be about 13 dB up from the intensity of the input wave. By comparison, with a Q of about 1000 and high extinction, the peak circulating intensity is about the same as the intensity in the input waveguide. So, it is reasonable to expect that it will be possible to get at least 10 dB of improvement in the circulating intensity, and thus in the conversion efficiency, by fabricating higher Q rings.

While several illustrative embodiments of the invention have been shown and described in the above description, numerous variations and alternative embodiments will occur to those skilled in the art. Such variations and alternative embodiments are contemplated, and can be made without departing from the scope of the invention as defined in the appended claims.

LIST OF REFERENCES CITED

1. R. A. Soref, J. P. Lorenzo, "All-Silicon Active and Passive Guided-Wave Components For Lambda=1.3 and 1.6 MU-M," IEEE J. Quantum Elect. 22, 873-879 (1986)
2. A. S. Liu, R. Jones, L. Liao, D. Samara-Rubio, D. Rubin, O. Cohen, R. Nicolaescu, M. Paniccia, "A high-speed silicon optical modulator based on a metal-oxide-semiconductor capacitor," Nature 427, 615-618 (2004)
3. A. Scherer, O. Painter, J. Vuckovic, M. Loncar, T. Yoshie, "P hotonic crystals for confining, guiding and emitting light," IEEE T. Nanotechnol. 1, 4-11 (2002)
4. A. Layadi, A. Vonsovici, R. Orobtchouk, D. Pascal, A. Koster, "Low-loss optical waveguide on standard SOI/SIMOX substrate," Opt. Commun 146, 31-33 (1998)
5. Q. F. Xu, V. R. Almeida, R. R. Panepucci, M. Lipson, "Guiding and Confining Light in Void Nanostructures," Opt. Lett. 29, 1206-1211 (2004)
6. T. Baehr-Jones, M. Hochberg, C. Walker, A. Scherer, "High-Q optical resonators in silicon-on-insulator-based slot waveguides," Appl. Phys. Lett. 86, 081101 (2005)
7. M. Bass, P. A. Franken, J. F. Ward, G. Weinreich, "Optical Rectification," Phys. Rev. Lett. 9, 446 (1962)
8. L. R. Dalton, "Organic electro-optic materials," Pure Appl, Chem. 76, 1421-1433 (2004)
9. Y. Y. Huang, G. T. Paloczi, A. Yariv, C. Zhang, L. R. Dalton, "Fabrication and replication of polymer integrated optical devices using electron-beam lithography and soft lithography," J. Phys. Chem. B. 108, 8606-8613 (2004)
10. A. Nahata, D. H. Auston, C. J. Wu, J. T. Yardley, "Generation of Terahertz Radiation From a Poled polymer," Appl. Phys. Lett., 67, 1358-1360 (1995)
11. F. Pockels, Lehrbuch der Kristalloptik (B. G. Teubner, Leipzig and Berlin, 1906)
12. C. Zhang, L. R. Dalton, M. C. Oh, H. Zhang, W. H. Steier, "Low V-pi electrooptic modulators from CLD-1: Chromophore design and synthesis, material processing, and characterization," Chem. Mater. 13, 3043-3050 (2001)
13. Silicon Genesis Corporation, 61 Daggett Drive, San Jose, Calif. 95134
14. D. Taillaert, P. Bienstman, R. Baets, "Compac t efficient broadband grating coupler for silicon-on-insulator waveguides," Opt. Lett. 29, 2749-2751 (2004)
15. R. Boyd, Nonlinear Optics, Second Edition (Academic Press, New York, 2003)
16. S. Graf, H. Sigg, W. Bachtold, "High-frequency electrical pulse generation using optical rectification in bulk GaAs," Appl. Phys. Lett. 76, 2647-2649 (2000)

What is claimed is:

1. A method for detecting optical radiation, comprising:
providing a slot waveguide, the slot waveguide comprising a first portion and a second portion, the second portion being electrically isolated from the first portion;
filling the slot waveguide with an electro-optic polymer;
inputting optical radiation into the slot waveguide, the first portion and second portion of the slot waveguide interacting with an optical field generated by said optical radiation; and
measuring a voltage difference between the first portion and the second portion to detect optical radiation.

2. The method of claim 1, wherein the slot waveguide is made of a material selected from silicon, III-V material, quaternary optical material, lithium niobate, GaAs, InP, GaN and GaP.

3. The method of claim 1, wherein the voltage difference is selected from a group comprising a DC voltage difference, an AC voltage difference and RF voltage difference.

4. The method of claim 1, wherein the slot waveguide is part of a resonator selected from ring resonator, linear resonator, oval resonator, and photonic crystal resonator.

5. The method of claim 1, wherein a distance between the first portion and the second portion is in the nanoscale range.

6. The method of claim 1, wherein the electro-optic polymer is a nonlinear Chi-2 material.

7. The method of claim 1, wherein the slot waveguide is filled by spin depositing the electro-optic polymer.

8. The method of claim 1, further comprising poling the electro-optic polymer.

9. The method of claim 8, wherein said poling is a corona poling.

10. The method of claim 8, wherein the first portion and the second portion of the waveguide act as poling electrodes during poling and as operating electrodes during measuring of the voltage difference.

11. A method for detecting optical radiation, comprising:
providing a slot waveguide, the slot waveguide comprising a first portion and a second portion, the second portion being electrically isolated from the first portion;
filling the slot waveguide with a nonlinear chi-2 material;
inputting optical radiation into the slot waveguide, the first portion and second portion of the slot waveguide interacting with an optical field generated by said optical radiation; and
measuring a voltage difference between the first portion and the second portion to detect optical radiation.

12. The method of claim 11, wherein the nonlinear chi-2 material is a dendrimer material or a material comprising quantum-dot doped polymer matricies.

13. An optical detector comprising:
a waveguide, the waveguide comprising a first component part and a second component part, the first component part and the second component part forming an electrical output of the detector, the first component part and the second component part being electrically isolated from each other and adapted to interact with an optical field generated by optical radiation;
a nonlinear optical material between the first component part and the second component part, said material providing a mechanism for nonlinear conversion of said optical radiation to an electrical signal; and
an arrangement to compare an electrical condition of the first component part with an electrical condition of the second component part to detect optical radiation, the arrangement being in contact with the first component part and the second component part.

14. The detector of claim 13, wherein the waveguide is a slot waveguide.

15. The detector of claim 13, wherein the waveguide is a plasmon-based waveguide.

16. The detector of claim 13, wherein the waveguide is a metal waveguide.

17. The detector of claim 13, wherein the arrangement comprises electrically isolated contacts.

18. The detector of claim 17, further comprising a device for confirming electrical contact of the contacts.

19. The detector of claim 13, further comprising a laser device producing an optical signal to be input to the nonlinear material.

20. The detector of claim 13, wherein a distance between the first component part and the second component part is in the nanoscale range.

21. The detector of claim 13, wherein the nonlinear material is a polymer.

22. The detector of claim 21, wherein the polymer is an electro-optic polymer.

23. The detector of claim 13, wherein the nonlinear optical material is a nonlinear material exhibiting a chi-2 moment.

24. An on-chip electronic arrangement comprising the optical detector of claim 13.

25. A silicon-on-insulator device comprising the optical detector of claim 13.

* * * * *